Figure 5:
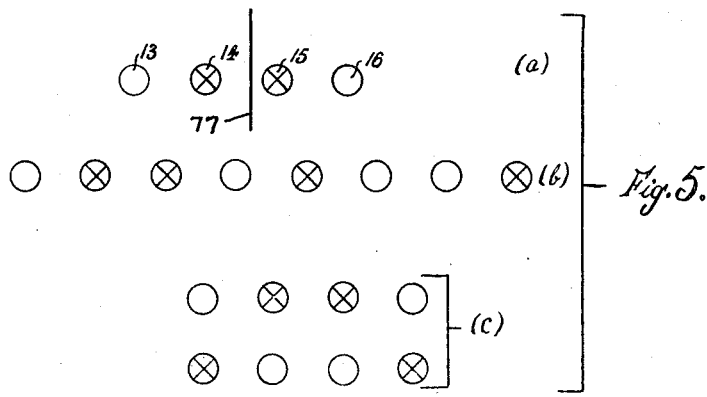

July 17, 1951  S. WHITEHEAD ET AL  2,560,834
LOCATION OF CONDUCTING AND/OR MAGNETIC BODIES
Filed Jan. 9, 1946  4 Sheets-Sheet 1
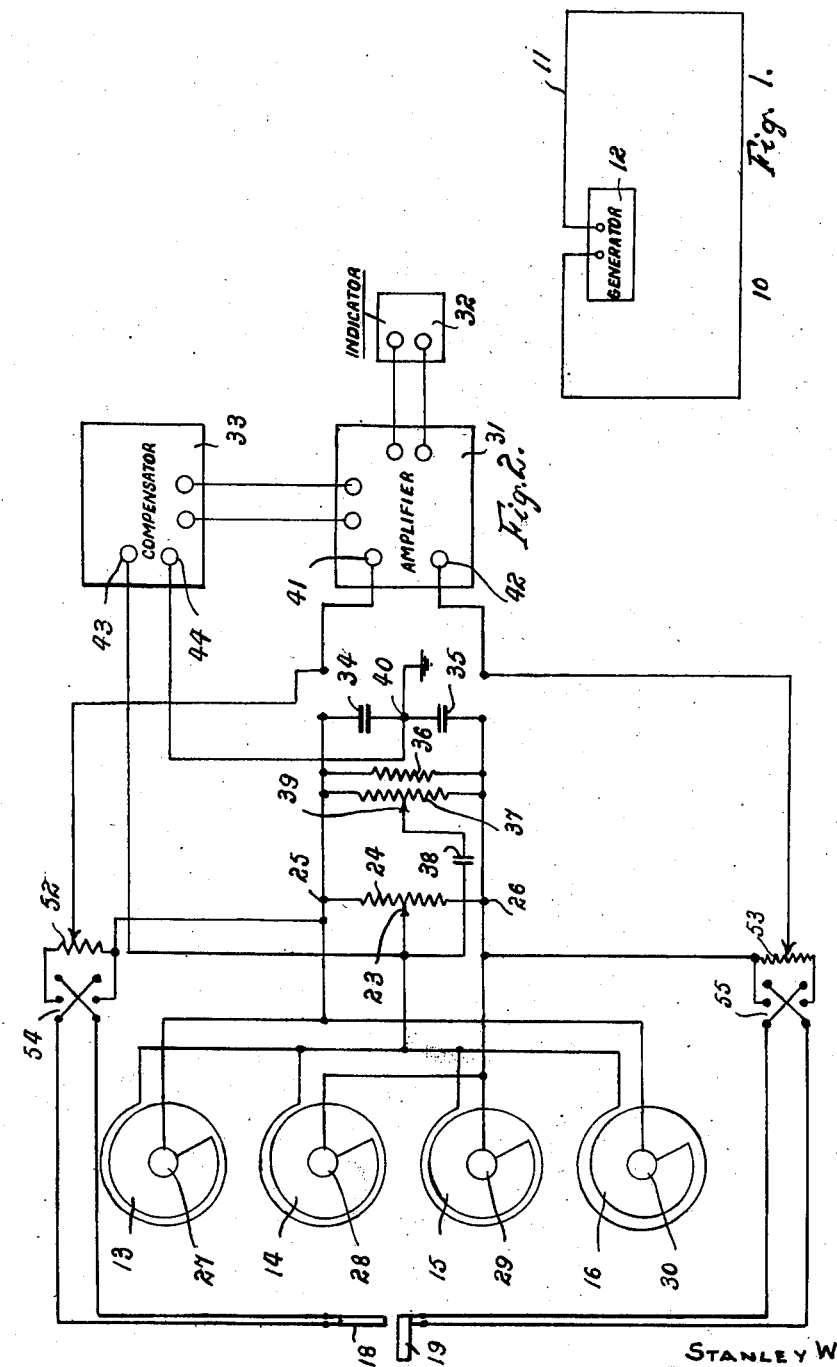
STANLEY WHITEHEAD
BENJAMIN ROSENBLUM
INVENTORS

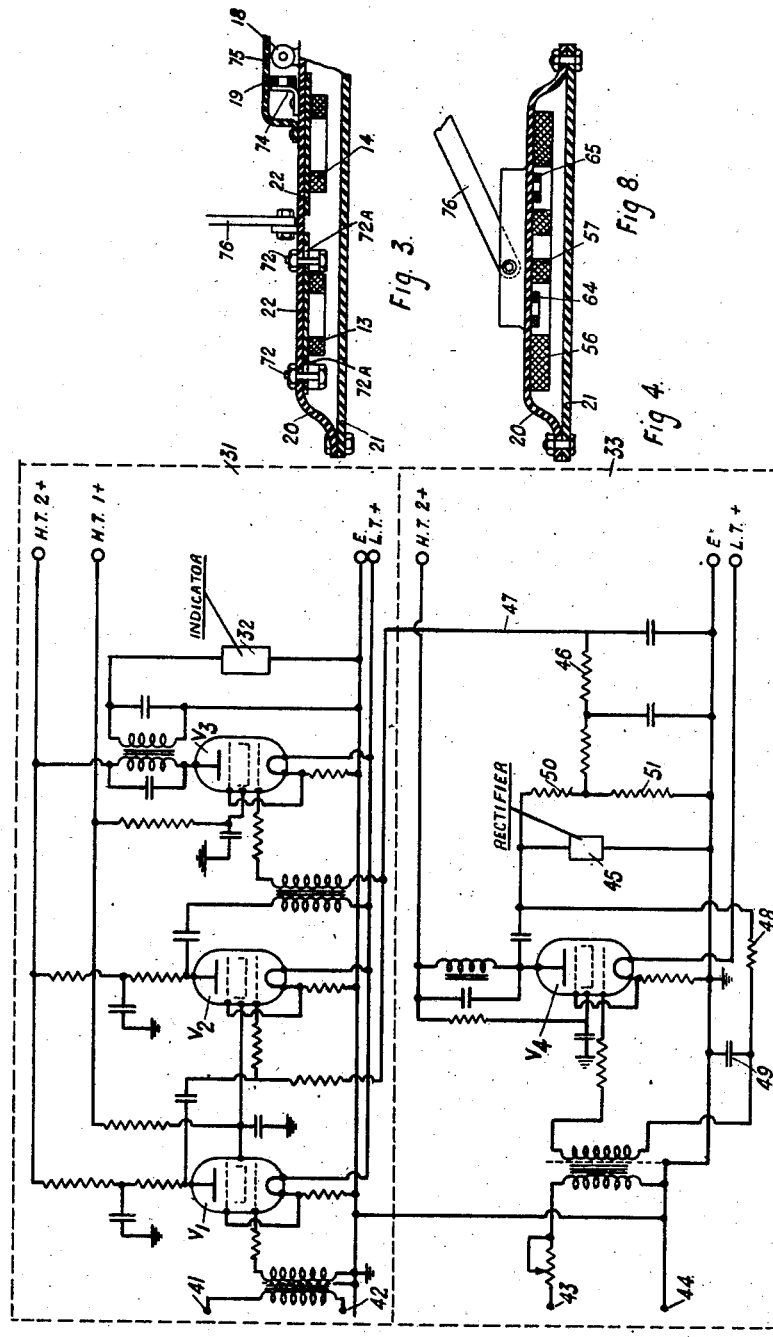

Stanley Whitehead
Benjamin Rosenblum
INVENTORS

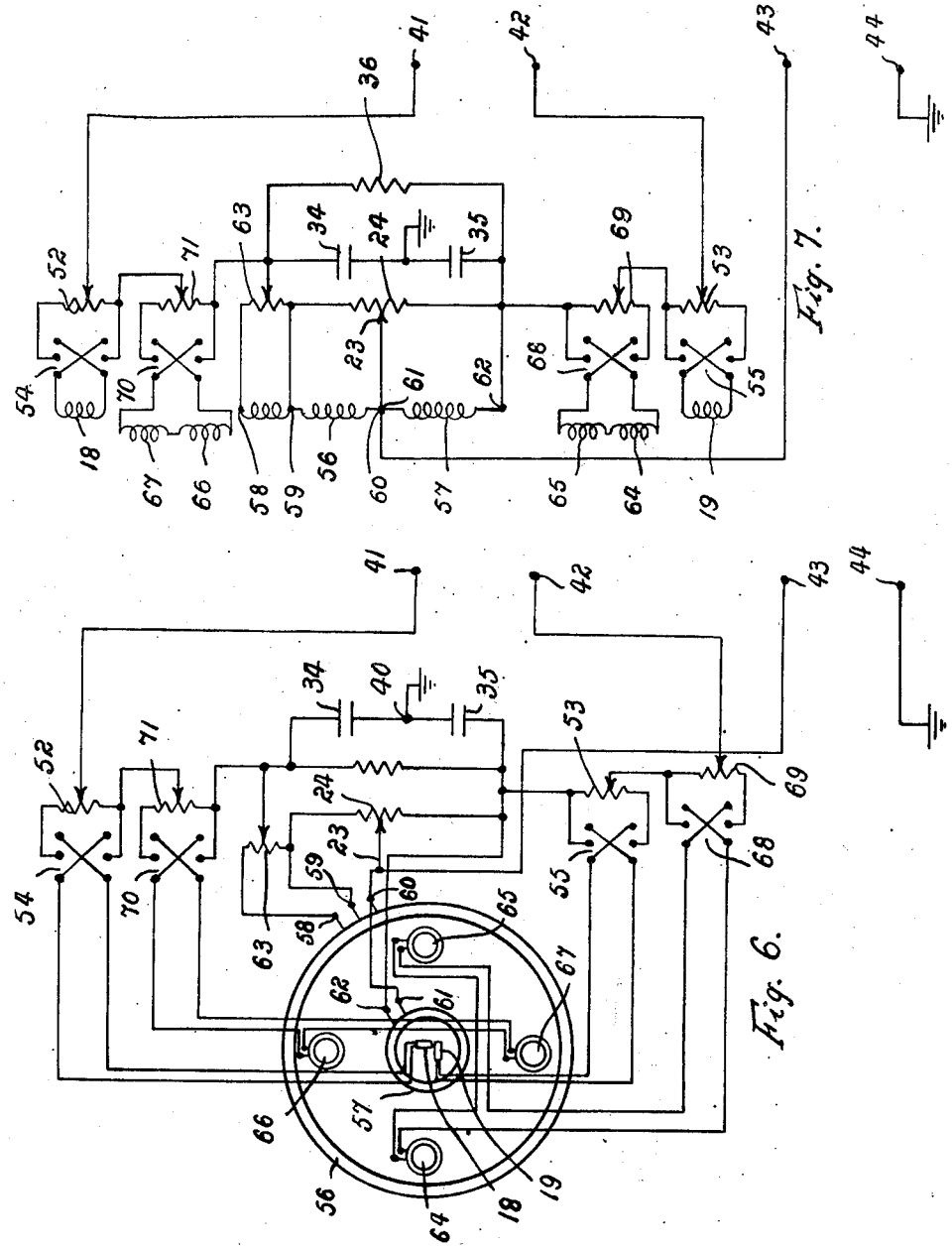

Patented July 17, 1951

2,560,834

UNITED STATES PATENT OFFICE 2,560,834

LOCATION OF CONDUCTING AND/OR MAGNETIC BODIES

Stanley Whitehead and Benjamin Rosenblum, London, England; said Rosenblum now by change of name Benjamin Roston Application January 9, 1946, Serial No. 639,986
In Great Britain January 24, 1945

7 Claims. (Cl. 175—182)

The present invention relates to the location of conducting and/or magnetic bodies, and particularly by the use of electro-magnetic means.

It is often desired to find objects which are hidden in a greater or smaller volume in space, often when they are buried or otherwise situated under the surface of the earth. In such a search advantage is generally taken of some property by which the objects differ from their surroundings. When dealing with conducting and/or magnetic bodies, such as ore bodies, pipes, cables, joint or junction boxes, tanks, cisterns and the like, the electro-magnetic method of location may be employed. The principle of this method is to produce an alternating magnetic field over the volume to be searched and to detect the distortion in the field due to the presence of the body to be located by reason of its magnetic permeability and/or the eddy currents induced in it.

The field may be produced only in the immediate vicinity of search or else it may be generated over a larger volume.

In the former application a two-coil locator is generally used, where one coil sets up a local magnetic field while the other serves as the search coil. This type can only be used in locating objects at a small depth below the surface of the ground, since the locator sensitivity is inversely proportional to the sixth power of the distance from the object. In addition interference between adjacent operators may occur unless they are provided with equipment of separate and individual frequencies.

Where sensitivity to objects placed at a greater depth is desired, the magnetic field is generated over a larger volume. One easy way of producing a magnetic field over a large volume is by means of an alternating current passing through a conductor. The return path of the current may either be through the soil or through another conductor. In the latter case a loop is formed which may consist of several turns, and it may be placed either outside the area of search or it may surround a part or the whole of the area.

The problem of location of metallic and/or magnetic objects would under such conditions be simplified if a uniform field could be produced, but this is generally impracticable. For this reason the method hitherto employed in prospecting has been to measure the magnetic field at a number of points by means of one or two search coils. The results are plotted, and from irregularities in the field the presence of searched objects is deduced.

It is the object of the present invention to provide search equipment to make such searches more direct and to enable them to be carried out expeditiously in spite of the use of a non-uniform magnetic field.

According to the present invention there is provided equipment for the location of electrically conducting bodies and magnetic bodies, comprising means, including a fixed electrically conducting loop and alternating current generating means, for producing an alternating magnetic field over a relatively large area, and search equipment for searching over said area and having dimensions which are small relatively to said loop, the search equipment comprising two groups of search coils each having a plurality of turns, each said group having at least one coil and the sum of the areas enclosed by the individual turns of the coils of one of said groups projected on to a first reference plane containing one of the turns being substantially equal to the same sum for the coils of the other of said groups, the same reference plane being used for both said groups, a mechanical structure fixedly supporting the coils with their centres substantially in a second reference plane and with the algebraic sum of the area-turns moments of coils of one of said groups substantially equal to the algebraic sum of the area-turns moments of the coils of the other of said groups, said area-turns moment for each of said coils being the product of (a) the sum of the areas enclosed by the turns of the coil projected on to said first reference plane and (b) the distance of the centre of the coil from any axis in said second reference plane, said first reference plane and said axis being the same for all said coils, and a voltage responsive device connected to indicate the difference between the electromotive forces generated by said field in the coils of said two groups.

Figure 9:
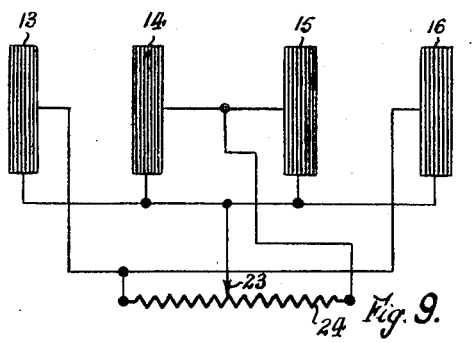
Figure 10:
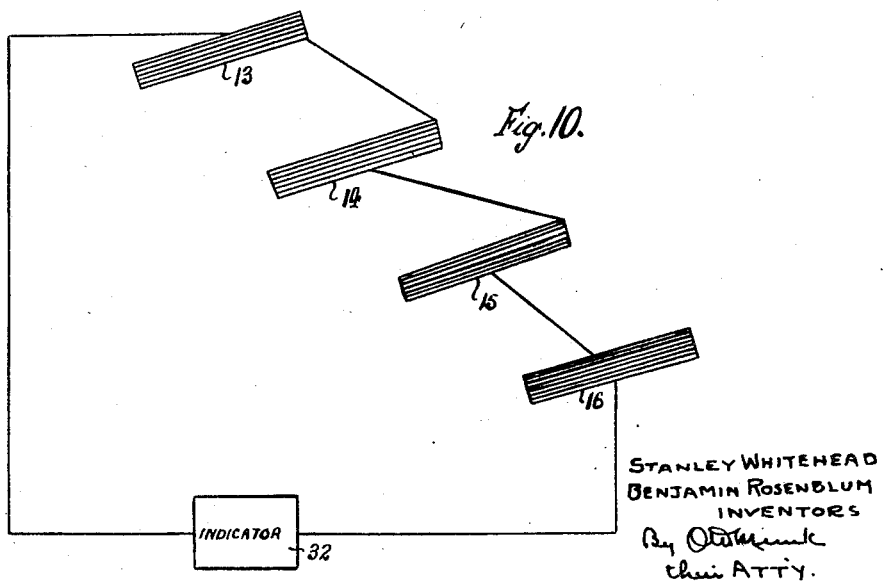

Other objects and features of the invention will be apparent from the following description in conjunction with the accompanying diagrammatic drawings in which Fig. 1 shows by way of example one arrangement for producing an alternating magnetic field in an area to be searched, Fig. 2 illustrates one embodiment of the invention by way of example, Fig. 3 is a view of a part of a search unit in sectional front elevation indicating the manner in which the search coils in Fig. 2 can be mounted, Fig. 4 is a circuit diagram of one form of amplifier and compensator for use in Fig. 2, Fig. 5 shows certain alternative arrangements of search coils, Fig. 6 illustrates a part of a further embodiment of the invention, Fig. 7 shows more clearly the circuit arrangement of Fig. 6, Fig. 8 is a view in sectional side elevation of a part of another search unit indicating the way in which the search coils in Figs. 6 and 7 may be mounted, Figs. 9 and 10 are diagrammatic sketches illustrating alternative arrangements of search coils shown in Figs. 2 and 3.

Like parts are given the same references in the several figures.

Referring to Fig. 1 an area 10 to be searched lies outside a loop of cable 11. A single turn loop is shown but two or more turns may be used if desired. By way of example the loop may measure 150 x 300 yards. A generator 12 is connected to feed to the loop an alternating current of a suitable frequency, for example 500 cycles per second. The generator 12 may be of 6 kilowatts. The current in the loop generates in the area 10 an alternating magnetic field which is distorted in the neighbourhood of conducting or magnetic bodies. It will be understood that it may if desired be arranged that the area to be searched is that within the loop.

Referring to Figs. 2 and 3, a search coil unit comprises four search coils 13, 14, 15 and 16 wound in the same sense, mounted in the same plane upon a support 20 upon which they can be rigidly fixed with their axes parallel and coplanar. Two compensating coils 18 and 19 are mounted upon the support 20 with their axes at right angles to those of the search coils and mutually perpendicular. The outer terminals of all the coils 13 to 16 are connected together and to an adjustable tap 23 on an impedance 24, in this case a resistor having two outer terminals 25 and 26. The inner terminals of the two outer coils 13 and 16 are connected together and to the terminal 25 whilst the inner terminals of the two inner coils 14 and 15 are connected together and to the terminal 26. A capacitor 38 is connected between the point 23 and an adjustable tapping point 39 on a resistor 37 which is connected in parallel with the resistor 24. The arrangement, constitution and connection of the coils 13 to 16 are such that the coils form a balanced system so that when these coils are traversed by like magnetic fields, or when they are situated in a uniform alternating field, two potentials tending to balance each other are applied between terminals 25 and 23 and between 26 and 23 respectively. Thus the potential difference between terminals 25 and 26 is substantially zero or at least considerably smaller than that obtained between 25 and 23 or that obtained between 26 and 23. By adjustment of the tappings 23 and 39 on resistors 24 and 37 respectively, and, if necessary, by slightly displacing one of the coils 13 to 16 relatively to other coils, it is arranged that there is substantially zero input to the amplifier due to the alternating magnetic field and the first space differential of the field as determined by moving the search unit in horizontal and vertical planes and rotating it about a vertical axis in the magnetic field area of search. The magnetic field space differential of $n$th order at any point in space is factorial $n$ times the increment in magnetic field at that point above a datum level, the increment being due to a spatial field variation of the $n$th order. Thus if $H$ is the magnetic field at a point distant $a$ from a feeder, then the field at a point $(a+\delta a)$ from the feeder is:

$$H+\delta H-\frac{1}{2!}\delta^2 H-\frac{1}{3!}\delta^3 H \cdots -\frac{1}{n!}\delta^n H$$

where $\delta^n H$ is the magnetic field space differential of $n$th order, and may be expressed by:

$$\delta^n H=\frac{d^n H}{da^n}(\delta a)^n$$

Each coil 13 to 16 may have connected in series with it and disposed co-axially within it a small trimming coil 27, 28, 29 and 30 respectively for the purpose of assisting the matching the coils exactly and so enabling the balance above referred to to be obtained.

In one example the coils 13 to 16 are each of 7½" inside diameter, 8¾" outside diameter and 0.2" in axial width; they are wound with 660 turns of 32 S. W. G. single silk covered enamelled copper wire and have a self-inductance of 180 millihenries. Their centres are 1 foot apart.

A part, approximately one half, of a search unit embodying search coils such as are shown in Fig. 2 is shown by way of example in Fig. 3. A housing of insulating, non-magnetic material has an upper part 20 and a cover plate 21 bolted thereto. Search coils 13 and 14 only are shown and each is fixed, for example by adhesive, to an insulating plate 22. The plate 22 of coil 13 has elongated apertures 72A through which pass bolts 72 whereby the coil 13 can be firmly clamped to the housing part 20 but can be slightly adjusted relatively to the other coils. The coil 14 has its plate 22 fixed to the housing 20 by adhesive. The other coils may be fixed similarly to coil 14 or one or both may be adjustable as coil 13. The coils 18 and 19 are mounted by brackets 73 and 74, respectively, above the part 22 and are provided with a cover 75. Two hinged handles are provided, a part of one being shown at 76.

When the coil system 13 to 16 is immersed in an alternating magnetic field which is distorted by the presence of a conducting and/or magnetic body, the fields traversing the coils are not the same and a difference of potential is produced between terminals 25 and 26. For the purpose of indicating this difference of potential or out-of-balance, there are provided as shown in Fig. 2 an amplifier 31 and an indicating device 32, such as a telephone receiver for example. The points 25 and 26 are connected to the amplifier input through resistors 52 and 53 respectively.

In the circuit of Fig. 2 so far described, variations in the mean magnetic field traversing the search coils will affect the voltage applied to terminals 25 and 26 and hence the indication given at 32. In order to reduce or eliminate this effect there may be provided a compensator 33. The input voltage for the compensator is derived from a balancing circuit comprising the resistors 24 and 37 and capacitors 38, 34 and 35. The joint 40 of the capacitors 34 and 35 is earthed, and the values of the capacitors 34 and 35 are arranged to be substantially less than those necessary for producing resonance with the coils 13, 14, 15 and 16 at the frequency of the alternating magnetic field.

The potential difference between points 23 and 40 is approximately proportional to the mean magnetic field in the region of the coil unit and this potential difference is applied to the input of the compensator 33. A circuit for the amplifier 31 and compensator 33 is shown in Fig. 4 within two dotted rectangles. The amplifier comprises three variable-mu amplifying valves V₁, V₂, and V₃ and has input terminals 41 and 42. The compensator comprises a variable-mu amplifying valve V₄ and has input terminals 43 and 44. The output of the valve V₄ is rectified by a rectifier 45. A part of the rectified output is tapped off from resistors 50 and 51, smoothed in a circuit 46 and applied through a lead 47 as a bias to suitable grids of one or more of the valves of the amplifier 31, in this example to the control grids of the valves V₂ and V₃. The D. C. voltage developed across the rectifier 45 is also fed back to the control grid of the valve V₄ through a smoothing circuit comprising a resistor 48 and condenser 49.

The valve V₄ is preferably chosen to have the same characteristics as the valves V₂ and V₃ of which it controls the amplification so that the relation between the control bias applied through lead 47 and the amplification of the valves V₂ and V₃ is substantially identical with the same relation in the compensator valve V₄. By suitably adjusting the ratio of the D. C. voltage fed back to the grid of the valve V₄ to the D. C. voltage applied to the grids of the valves V₂ and V₃, the amplifier output can be made independent of the mean field strength. Although one form of compensator has been described by way of example, other known or suitable compensating means may be provided.

With the arrangement of four search coils 13 to 16 described and shown in Figs. 2 and 3, there is substantially zero input to the amplifier 31 due to the alternating field generated in the area 10 of Fig. 1 when the search coil unit is in this field. There is also substantially zero input to the amplifier due to the first space differential of the field determined by moving the search unit in horizontal and vertical planes and by limited rotation thereof about a vertical axis parallel to the coil axes.

Substantial balance so far as forward or lateral rotation of the search unit about horizontal axes can be secured with the aid of the coils 18 and 19. The coil 18 is connected through a reversing switch 54 across the resistor 52 and the coil 19 is connected through a reversing switch 55 across the resistor 53. Voltages from the coils 18 and 19, adjustable by means of the tappings on the resistors 52 and 53 are therefore applied between terminals 25 and 41 and terminals 26 and 42 respectively. Any phase difference between these voltages and that developed between terminals 25 and 26 can be reduced by changing the value of the resistor 36 in Fig. 2. In order to adjust the unit, the tappings on the resistors 52 and 53 and the reversing switches 54 and 55 are adjusted until the desired balance is obtained when the unit is given limited rotary movements about horizontal axes.

In the arrangement described the electromotive force applied between terminals 41 and 42 will still give an indication at 32 when the coil unit is rotated in such a way as to generate an electromotive force dependent on the second and higher space differentials of the magnetic field but the magnitudes of these drop rapidly with increase in distance from the cable 11 in Fig. 1. If desired space differentials of second and higher orders may be substantially balanced by the use of a multiple of four coils.

Thus referring to Fig. 5, at $a$ is shown the coil arrangement of Fig. 2, the mode of connection of the coils to the resistor 24 being indicated by a circle and a cross within a circle. Thus coils 13 and 16 which have their inner terminals connected to terminal 25 and form one group of coils are indicated in Fig. 5 by a plain circle and coils 14 and 15 which have their inner terminals connected to terminal 26 and form a second group are indicated by a cross within a circle.

Using this representation, a search unit having eight coils arranged and connected as indicated at $b$ in Fig. 5 will give balance of the first and second differentials in all directions of rotation. Similarly eight coils arranged and connected as shown in Fig. 5 (c) will give balance of all differentials in one direction but balance only of the first differential in another direction.

In Fig. 5 (a) it is assumed that (a) the sums of the areas enclosed by the turns of the coils 13, 14, 15 and 16 projected on to a plane containing one of the turns, that is to say in this case a plane parallel to the plane of the paper, are equal, (b) the distances between the centres of adjacent coils are equal, (c) the axis shown at 77 is perpendicular to the axis joining the centres of the coils and is disposed midway between the coils 14 and 15, and (d) measurements to the left of the axis 77 are negative and to the right of the axis 77 are positive. The product of (a) the sum of the areas enclosed by the turns of one of the coils projected on to the plane containing one of the turns and (b) the distance of the centre of that coil from some axis such as the axis 77, will be termed the area-turns moment of the coil. The sum of the areas enclosed by the turns of a coil, if all the turns enclosed the same area, would of course be the product of the area and the number of turns. On the basis of the above assumptions it can be shown that the algebraic sum of the area-turns moments of the coils 14 and 15, forming one group, is equal to the algebraic sum of the area-turns moments of the coils 13 and 16 forming the second group.

It will be appreciated that these algebraic sums are equal for any axis in a plane containing the centres of the coils. Furthermore it can be shown that these algebraic sums are also equal for the two groups of coils shown in each of Figs. 5 (b) and (c).

Although the coils shown in Fig. 5 are assumed to have equal numbers of turns, to be equally spaced and to have the same area-turns, these conditions are not essential for obtaining the desired results. One essential condition is that the sum of the areas enclosed by the turns of the coils of one of the groups projected on to a plane containing one of the turns must be substantially equal to the same sum for the coils of the other group. In order to ensure that there is substantially zero input to the amplifier due to the first space differential of the field, it is necessary to arrange that the algebraic sum of the area turns moments of the coils of the two groups are substantially equal. It will be appreciated therefore, that coils having different dimensions and unequal numbers of turns may be used.

In the arrangements of Figs. 5 (b) and (c), it can be arranged that the input to the amplifier due to the second space differential of the field is substantially zero by ensuring that the sum of the products of (a) the area-turns moments of the coils of one of the groups and (b) the respective distances used in determining the moments, is substantially equal to the same sum for the coils of the other group.

Other multiples of four coils than two may be employed, and by suitable connection and disposition the required balance can be obtained.

It is also possible to obtain the balance with two coils provided that they are arranged co-axially and coplanar.

Thus, referring to Figs. 6 and 7, the search unit in this example comprises two coils 56 and 57 mounted co-axially and coplanar. The coil 56 has three terminals 58, 59 and 60, and the coil 57 two terminals 61 and 62, terminals 60 and 61 being connected together. The part of coil 56 between terminals 58 and 59 serves as a balancing coil the effect of which is adjustable by means of a variable tap on a resistor 63. The number of turns in, and the dimensions of, the coils are so arranged, according to well known formulae, that coil 57 and part of coil 56 between terminal 60 and a mid-point between terminals 58 and 59 have equal and opposite electro-motive forces induced in them when placed in a uniform magnetic field.

In order to reduce the input to the amplifier produced by rotation of the search unit about its axis normal to the plane of the coils, that is to say, perpendicular to the plane of the paper in Fig. 6, there may be provided a number, for example four, coils 64, 65, 66 and 67 mounted in the same plane as the coils 56 and 57 but arranged eccentrically with respect to the axis of the coils 56 and 57. The eccentric coils 64 and 65 are connected in series and deliver their voltages through a reversing switch 68 and a potential divider 69. The eccentric coils 66 and 67 are connected in series and deliver their voltages through a reversing switch 70 and potential divider 71.

Coils 18 and 19 may also be provided in the manner and for the purpose described in connection with Fig. 2.

One form of search unit embodying coils as in Figs. 6 and 7 is shown in Fig. 8 and is similar to that of Fig. 3. The search coils 56 and 57 are fixed to the housing part 20 for example by adhesive. Eccentric coils, of which two are shown at 64 and 65, may be fixed in like manner.

It is not essential in all cases to generate a magnetic field in the search area. In some cases the body to be located, for instance a buried cable carrying an alternating current, may itself generate a sufficient magnetic field strength.

It will be appreciated that certain embodiments of the invention have been described by way of example only and may be modified in various ways within the scope of the invention as defined in the appended claims. Thus the principal search coils may be mounted horizontally as shown in Fig. 3, vertically as shown in Fig. 9 or in some intermediate manner for example as shown in Fig. 10. The coils, instead of being connected in series-parallel, as in Fig. 2, may be connected in series as shown in Fig. 6 or Fig. 10 or in parallel.

We claim:

1. Apparatus for the location of electrically conducting bodies and magnetic bodies, comprising means including an electrically conducting loop and alternating current supply means connected to said loop, for producing an alternating magnetic field of substantial strength over a large area, and search apparatus for searching over said area, said search apparatus being movable relatively to said loop and including a plurality of search coils and a substantially non-metallic structure for supporting said coils in fixed relation to one another, said coil being arranged in at least one set, each said set including a plurality of search coils arranged in a row with their centers in a substantially straight line, an indicating device and means connecting said search coils in two groups to said indicating device, each coil of one of said groups being disposed between at least two of the coils of the other of said groups, said connecting means serving to apply the voltages induced in said two groups by said field in opposite senses to said indicating device, the sum of the areas enclosed by all the individual coil turns in one of said groups projected on to a reference plane containing one of the turns of one of said coils, being equal to the same sum for the other of said groups, the same reference plane being used for all said coils, and the algebraic sum of the area-turns moments of the coils in one of said groups being equal to the algebraic sum of the area-turns moments of the coils in the other of said groups, said area-turns moment of each of said coils being the product $a$, $b$, where $a$ is the sum of the areas enclosed by all the individual turns of the coil projected on to said reference plane, and $b$ is the distance of the center of the coil from any axis which cuts said line joining the centers of said coils.

2. Apparatus for the location of electrically conducting bodies and magnetic bodies, comprising means including an electrically conducting loop and alternating current supply means connected to said loop, for producing an alternating magnetic field of substantial strength over a large area, and search apparatus for searching over said area, said search apparatus being movable relatively to said loop and including a plurality of search coils and a substantially non-metallic structure for supporting said coils in fixed relation to one another, said coils being arranged in at least one set, each said set including four search coils arranged in a row with their centers substantially in a straight line, an indicating device, means connecting the two outer coils in said row to said indicating device to form one group and means connecting the two inner coils in said row to said indicating device to form a second group, said connecting means serving to apply the voltages induced in said two groups in opposite senses to said indicating device, the sum of the areas enclosed by all the individual coil turns in one of said groups projected on to a reference plane containing one of the turns of one of said coils, being equal to the same sum for the other of said groups, the same reference plane being used for all said coils, and the algebraic sum of the area-turns moments of the coils in one of said groups being equal to the algebraic sum of the area-turns moment of the coils in the other of said groups, said area-turns moment of each of said coils being the produce $a$, $b$, where $a$ is the sum of the areas enclosed by all the individual turns of the coil projected on to said reference plane, and $b$ is the distance of the centre of the coil from any axis which cuts said line joining the centers of said coils.

3. Apparatus for the location of electrically conducting bodies and magnetic bodies, comprising means including an electrically conducting loop and alternating current supply means connected to said loop, for producing an alternating magnetic field of substantial strength over a large area, and search apparatus for searching over said area and having dimensions which are small relatively to those of said loop, said search apparatus being movable relatively to said loop and including four substantially equally-spaced search coils arranged in a substantially straight row, an indicating device, means connecting the two outer coils in said row to said indicating device, and means connecting the two inner coils in said row to said indicating device, said connecting means serving to connect said two outer coils in opposition with said two inner coils, said four search coils being of equal area turns, and the turns of all said coils lying in parallel planes.

4. Apparatus as claimed in claim 1, and comprising two compensating coils mounted upon said structure with their axes mutualy perpendicular and perpendicular to the axes of said search coils, and means for applying a compensating voltage from said compensating coils to said indicating device for the purpose of balancing.

5. Apparatus as claimed in claim 1, wherein the indicating device comprises an amplifier, and wherein compensating means are provided, said compensating means being connected to said amplifier to render the output of said amplifier substantially independent of variations in the mean strength of said alternating magnetic field.

6. Apparatus as claimed in claim 1, wherein said indicating device comprises an amplifier, and means are provided to produce a rectified voltage dependent upon variations in the strength of said alternating magnetic field which affect all said coils equally, the last said means being connected to said amplifier to apply said rectified voltage to said amplifier to control the gain thereof.

7. Apparatus according to claim 1, wherein one of said search coils is mounted for limited movement relatively to said structure to facilitate initial adjustment of said search equipment.

STANLEY WHITEHEAD.
BENJAMIN ROSENBLUM.

REFERENCES CITED

The following references are of record in the file of this patent:

UNITED STATES PATENTS

| Number | Name | Date |
|---|---|---|
| 1,812,392 | Zuschlag | June 30, 1931 |
| 2,238,072 | Nelson et al. | Apr. 15, 1941 |
| 2,451,596 | Wheeler | Oct. 19, 1948 |